US009684656B2

(12) United States Patent
Ning (10) Patent No.: US 9,684,656 B2
(45) Date of Patent: Jun. 20, 2017

(54) CREATING PERSONALIZED AND CONTINUOUS PLAYLISTS FOR A CONTENT SHARING PLATFORM BASED ON USER HISTORY

(71) Applicant: Google Inc., Mountain View, CA (US)

(72) Inventor: Huazhong Ning, San Jose, CA (US)

(73) Assignee: Google Inc., Mountain View, CA (US)

(*) Notice: Subject to any disclaimer, the term of this patent is extended or adjusted under 35 U.S.C. 154(b) by 201 days.

(21) Appl. No.: 13/955,902

(22) Filed: Jul. 31, 2013

(65) Prior Publication Data
US 2015/0039620 A1 Feb. 5, 2015

(51) Int. Cl.
*G06F 17/30* (2006.01)
(52) U.S. Cl.
CPC .............. *G06F 17/30053* (2013.01)
(58) Field of Classification Search
CPC .................................... G06F 17/30053
USPC ......................................... 707/740
See application file for complete search history.

(56) References Cited

U.S. PATENT DOCUMENTS

| 8,258,390 | B1 | 9/2012 | Gossweiler et al. | |
| 8,260,656 | B1* | 9/2012 | Harbick ............... | G06Q 30/02 705/26.7 |
| 2003/0101449 | A1* | 5/2003 | Bentolila ............ | G06Q 30/0251 725/10 |
| 2003/0236582 | A1 | 12/2003 | Zamir et al. | |
| 2008/0168390 | A1* | 7/2008 | Benyamin ......... | G06F 17/30743 715/810 |
| 2009/0276453 | A1* | 11/2009 | Trout ................. | G06F 17/30029 |
| 2010/0146530 | A1* | 6/2010 | Bolyukh et al. ................ | 725/14 |
| 2011/0314039 | A1* | 12/2011 | Zheleva ............ | G06F 17/30035 707/767 |

OTHER PUBLICATIONS

Schaeffer, SE. "Graph clustering," Computer Science Review. Aug. 2007, vol. 1, Iss. 1, p. 27-64 [retreived on Aug. 25, 2014], retrieved from the Internet: <URL: http://geza.kzoo/edu/~erdi/patent/Schaeffer07.pdf>.
International Search Report and Written Opinion for the International Patent Application No. PCT/US14/38856, mailed Oct. 20, 2014, 10 pages.

(Continued)

*Primary Examiner* — Mahesh Dwivedi
*Assistant Examiner* — Johnese Johnson
(74) *Attorney, Agent, or Firm* — Lowenstein Sandler LLP (57) ABSTRACT

A method for creating personalized and continuous playlists for a content sharing platform based on user history is disclosed. The method includes grouping content items into groups based on whether users access the content items close together in time and whether the content items appear together in search results and are both selected by the users, the groupings representing a relatedness between pairs of the content items, determining probabilities that the users transition between the groups when viewing the content items, assigning, for a user of the users, a score to each group in a subset of the groups, wherein the scores represents preferences of the user for viewing the content items of the subset, selecting, for the user, a group in the subset based on the assigned scores and the probabilities, and providing a content item from the selected group to include in a playlist generated for the user.

20 Claims, 5 Drawing Sheets (56) References Cited

OTHER PUBLICATIONS

European Search Report for Application No. 14831335.6, mailed Jan. 4, 2017, 6 pages.
Schaeffer, SE., "Graph clustering", Computer Science Review I, vol. 1, No. ISS. 1, 2007, pp. 27-64, XP022365527.

* cited by examiner

For each pair of content items of a content sharing platform, determine a weight for the pair based on a relatedness of the pair
310

Group content items of content sharing platform into clusters based on the determined weights
320

For each pair of clusters, determine a weight for the pair of clusters based on a probability that users of the content sharing platform transition between the clusters when viewing content items of the clusters
330

Generate a cluster transition matrix representing the determined weights for the pairs of clusters
340

For each user of the content sharing platform, generate a user model including a subset of the clusters and a preference score of the user for each cluster of the subset, where the user preference score for a cluster is based on a user watch history of the content items of the cluster
350

CREATING PERSONALIZED AND CONTINUOUS PLAYLISTS FOR A CONTENT SHARING PLATFORM BASED ON USER HISTORY

TECHNICAL FIELD

This disclosure relates to the field of content sharing networks and, in particular, to creating personalized and continuous playlists for a content sharing platform based on user history.

BACKGROUND

On the Internet, social networks allow users to connect to and share information with each other. Many social networks include a content sharing aspect that allow users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, users are spending increased amounts of time on content sharing platforms. Similar to a television or radio experience, users typically prefer to watch or listen to content without interruptions or having to decide what to watch next. Some content sharing platforms allow users to create playlists that allow the user to create a list of favorite media items to automatically play without interruption. However, generation of such playlists is a manual process that can take time and resources to understand and enable. Moreover, these playlists are generally finite and quickly get repetitive and outdated as channels continually release new material. User interests may vary when consuming content and the manually-generated static playlist cannot capture the user's dynamic interests.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for creating personalized and continuous playlists for a content sharing platform based on user history is disclosed. The method includes grouping content items into groups based on whether users access the content items close together in time and whether the content items appear together in search results and are both selected by the users, the groupings representing a relatedness between pairs of the content items. The method further includes determining probabilities that the users transition between the groups when viewing the content items and assigning, for a user of the users, a score to each group in a subset of the groups, wherein the scores represents preferences of the user for viewing the content items of the subset. Furthermore, the method includes selecting, for the user, a group in the subset based on the assigned scores and the probabilities and providing a content item from the selected group to include in a playlist generated for the user.

In one implementation, the co-occurrence comprises at least one of the pair of content items being viewed by the same user in a time interval or the pair of content items being returned as a query items in a same result. In addition, the score associated with the user is a function of a number of viewed content items of the group and is normalized with respect to the other scores associated with the user and assigned to the groups of the subset of groups.

In some implementation, the method further comprising repeating the selecting the group and the providing the content item. Furthermore, the subset of groups may be selected based on a number of the content items of each of the groups viewed by the user. In addition, the selecting the group further comprises selecting the group of the subset of the groups that of the probabilities of transitioning from a previous selected group of the subset of groups to the selected group and the assigned score for the selected group.

In one implementation, the selecting the content item is based on at least one of appearance of the selected content item in the playlist previously, quality of the content item, or age of the content item in terms of upload to the content sharing platform. In addition, the assigning the score associated with the user to the each group may be repeated based on new data representing current behavior and feedback of the user received since a previous iteration of the assigning. Furthermore, the playlist of the user may comprise a plurality of the content items that stream to the user without interruption.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for creating personalized and continuous playlists for a content sharing platform based on user history. In one implementation, a content sharing platform models individual user behavior and aggregates user behavior to generate a personalized and continuous playlist for the user on the content sharing platform. A playlist may include a list of content items that can be played (e.g., streamed) in sequential or shuffled order on the content sharing platform. In implementations of the disclosure, a user playlist is built in two stages.

In a first stage, content items of the content sharing platform are grouped into clusters based on relatedness of the content items. Relatedness between content items may be based on a variety of factors including, but not limited to, co-occurrence of the content items when viewed by the same user in a same session, whether the content items are returned together in query results, similarity of content in the content items (e.g., based on metadata associated with the content items), and so on. For example, co-occurrence may result when a user accesses two content items within a predetermined time interval, or two content items are included in the results of the same search query and are also selected from the results of that same search query.

In addition, a cluster transition matrix is generated in the first stage. The cluster transition matrix identifies probabilities of users transitioning between the clusters of content items (generated in the first stage described above) when viewing content items of the content sharing platform. Then, user models for each user are created in view of the clusters, where each user model identifies user preference scores of the user for at least a subset of the clusters. These user preference scores may be based on a user watch history in relation to content items in the clusters (e.g., the more content items within a cluster that are watched by a user, the higher the user preference score for the cluster). In some implementation, this first stage may be performed offline (e.g., without network connection/interaction with users of the content sharing platform).

In a second stage, a personalized and continuous user playlist is generated for a user of the content sharing platform. First, a preferred cluster (from the set of clusters) is selected for the user based on the previously-generated user model and/or the cluster transition matrix from the first stage. Then, a content item within the preferred cluster is selected based on factors including, but not limited to, any previous occurrences of the content item in the user playlist, a quality of the content item, and a recency of the content item (e.g., time since upload to the content sharing platform). In addition, the user model may be dynamically adjusted based on feedback received from the user while the user is viewing the playlist. For example, the user preference score of a cluster may be adjusted based on the user's action (e.g., watch majority, like, add to favorites, dislike, skip, etc.) when viewing a content item of the cluster in the user playlist.

Implementations of the disclosure have a different layer of granularity than previous solutions for playlist generation. Previously, a playlist generated for a user would be finite in nature with a predetermined number of content items included in the playlist. In addition, previous solutions utilized manual user input to determine preferences to guide selection of content items to include in the playlist. This resulted in a high frequency of decisions and interactions in a short period of time with the content sharing platform, creating friction and discontentment in the content sharing platform experience for the user. Implementations of the disclosure overcome these disadvantages by removing the need to make such frequent decisions by generating an automatic, personalized, and continuous playlist for a user based on the user's activity history.

Figure 1:
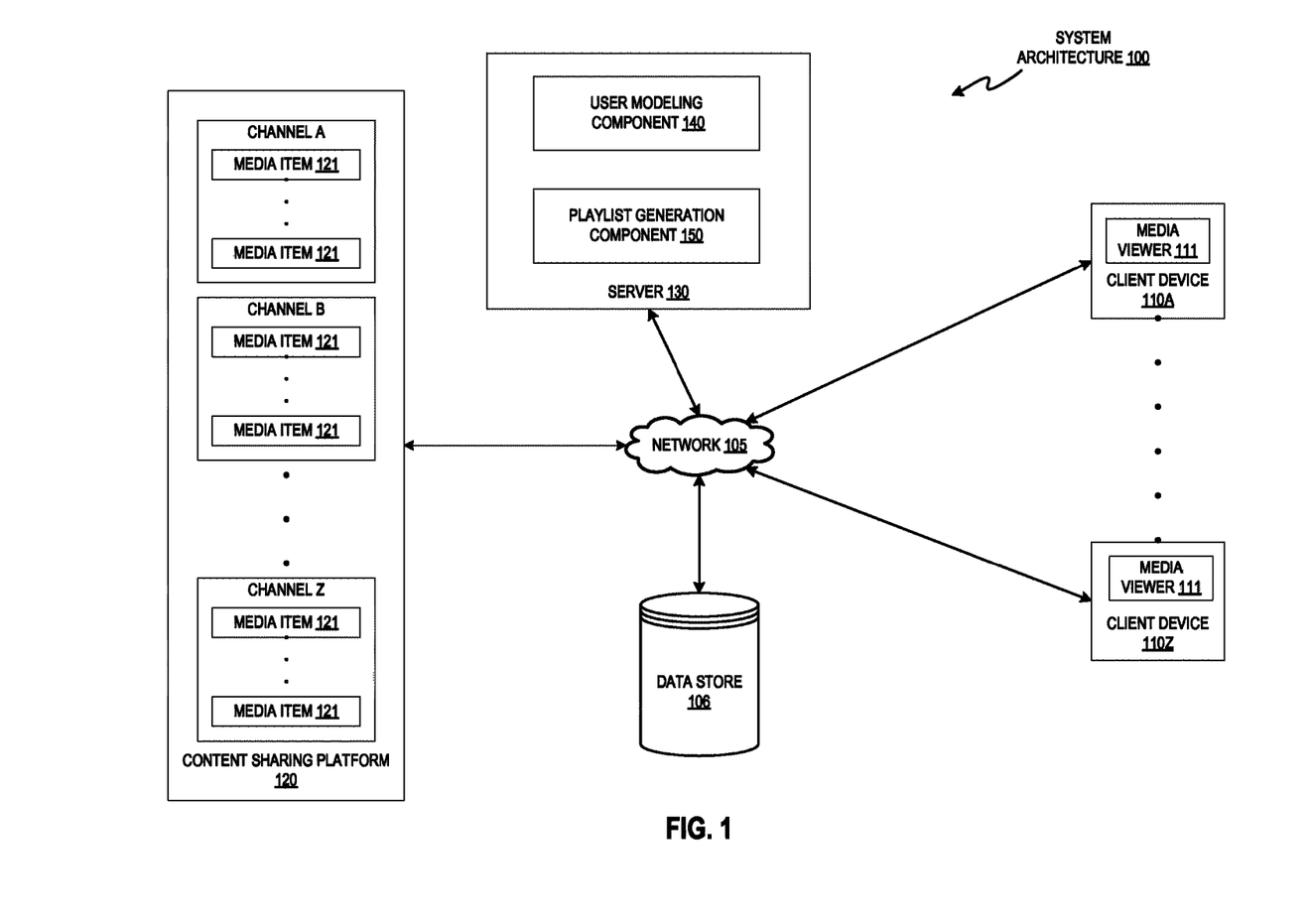
FIG. 1 illustrates an example system architecture, in accordance with one implementation of the disclosure.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," and a "digital media item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a user modeling component 140 and a playlist generation component 150. In some implementations, the user modeling component 140 and the playlist generation component 150 are maintained on separate servers 130.

In one implementation, the user modeling component 140 and the playlist generation component 150 operate together to provide personalized and continuous playlists for users of the content sharing platform 120 based on user history. The user modeling component 140 may cluster (e.g., organize into groups) content items 121 of the content sharing platform 120 based on relatedness between the content items, and may model individual user preferences associated with the clusters in an offline mode. The offline mode refers to the user modeling component 140 performing operations without interacting with any entities (e.g., requesting user input) via the network 105. In some implementations, the user modeling component 140 may perform the clustering and modeling on a periodic basis, such as once a day or every 12 hours, for example. This allows the user models to remain up-to-date (e.g., reflecting the most current user interests). Further description of the user modeling component 140 and its specific functions are described in more detail below with respect to FIG. 2.

The clusters and user models are then utilized by the playlist generation component 150 to create personalized and continuous playlists for users of the content sharing platform 120. When an individual user accesses the content sharing platform 120, the playlist generation module component 150 may retrieve the user model generated by the user modeling component 140 and utilize this user model to select a cluster and a content item within the cluster to populate a playlist that is personalized for the user. In some implementations, the playlist generation component 150 may operate in an online mode. The online mode may include communications and/or interactions with entities, such as a user, over network 105. The playlist generation component 150 may repeatedly perform the cluster selection and content item selection to generate a personalized and continuous playlist for the user.

In addition, the playlist generation component 150 may dynamically adapt the user model associated with user based on the user's actions with respect to the generated playlist. For example, the user's actions may include skipping a content item selection, completing playback of the selection, liking or otherwise indicating favorability of the selection, disliking or other indicating disfavor with the selection, and so on. User preferences reflected in the user model may be dynamically adjusted based on these user actions. Further description of the playlist generation component 150 and its specific functions are described in more detail below with respect to FIG. 2.

Although implementations of the disclosure are discussed in terms of content sharing platforms and subscriptions to channels of the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the user modeling module 140 and the playlist generation module 150 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the user modeling module 140 and the playlist generation module 150.

Figure 2:
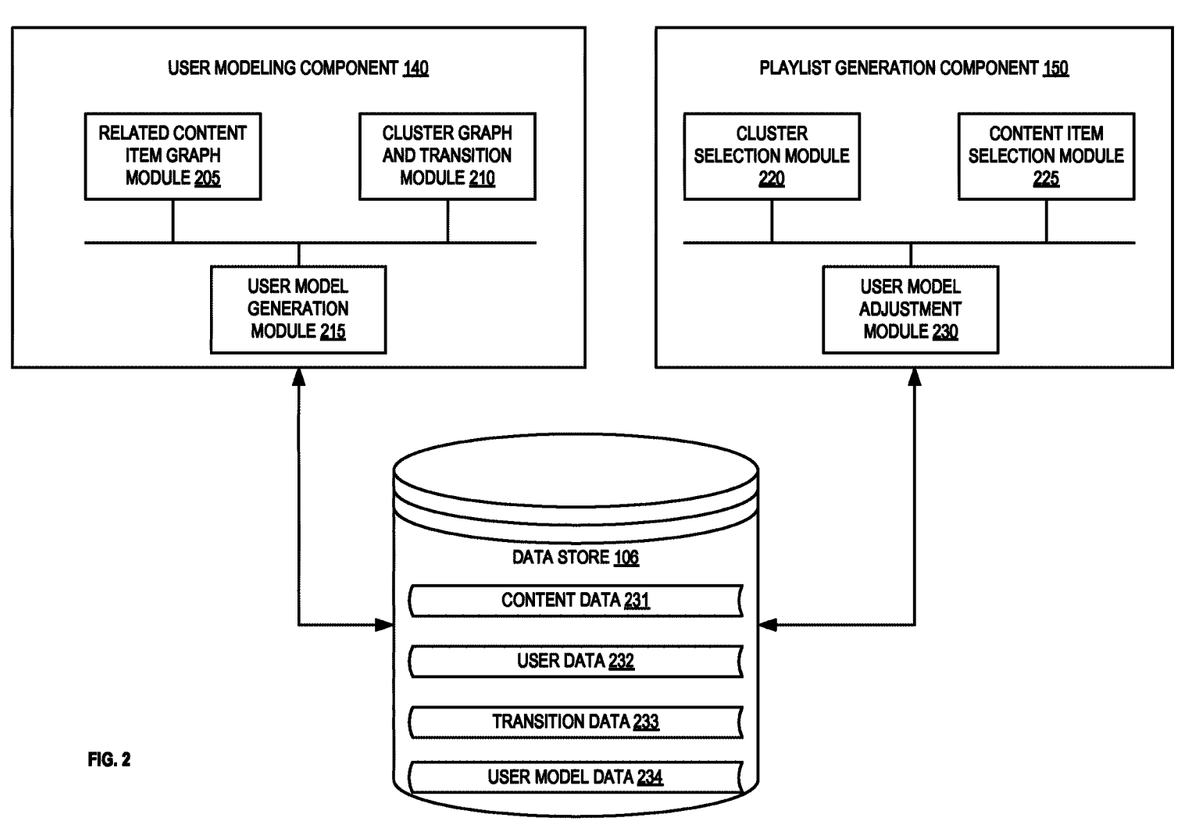
FIG. 2 is a block diagram illustrating a user modeling component and a playlist generation component, in accordance with one implementation of the present disclosure.

FIG. 2 is a block diagram illustrating a user modeling component 140 and a playlist generation component 150, in accordance with one implementation of the disclosure. In one implementation, the user modeling component 140 and the playlist generation component 150 are the same as their counterparts described with respect to FIG. 1. The user modeling component 140 includes a related content item graph module 205, a cluster graph and transition module 210, and a user model generation module 215. The playlist generation module 150 includes a cluster selection module 220, a content item selection module 225, and a user model adjustment module 230. More or less components may be included in each of the user modeling component 140 and the playlist generation component 150 without loss of generality. For example, two of the modules may be combined into a single module, or one of the modules may be divided into two or more modules. In one implementation, one or more of the modules may reside on different computing devices (e.g., different server computers).

The user modeling component 140 and the playlist generation component 150 are communicatively coupled to the data store 106. For example, the user modeling component 140 and the playlist generation component 150 may be coupled to the data store 106 via a network (e.g., via network 105 as illustrated in FIG. 1). In another example, one or both of the user modeling component 140 and/or the playlist generation component 150 may be coupled directly to a server where the user modeling module 140 and/or the playlist generation component 150 reside (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content data 231, user data 232, transition data 233, and user model data 234.

As discussed above, the user modeling component 140 and the playlist generation component 150 operate together to provide personalized and continuous playlists for users of the content sharing platform 120 based on user history. The user modeling component 140 can operate offline (e.g., without a connection to users of the content sharing platform) to cluster content items of the content sharing platform based on relatedness between the content items. Relatedness between content items may be computed based on a variety of factors including, but not limited to, co-occurrence of the content items when viewed by the same user in a same sessions, whether the content items are returned together in query results, whether the content items are selected from query results by the same (or different) users, similarity of content in the content items (e.g., based on metadata associated with the content items), and so on. The user modeling component 140 also can model preferences of the users of the content sharing platform with respect to the clusters.

In one implementation, the related content item graph module 205 of the user modeling component 140 first constructs a related content item graph of all content items 231 uploaded to the content sharing platform. In one implementation, the related content item graph is a directed graph that is a set of nodes connect by edges, where the edges have a direction associated with them. The related content item graph may be built based on behavior logs of all users of the content sharing platform 140. The behavior logs may be part of user data 232 maintained in data store 106. Behavior logs may include, but are not limited to, data, for each user of the content sharing platform, on which content items 231 a user watches, a number of watches of each content item, a frequency of watches of a content item, a date/time stamp of a watch of a content item, a source (e.g., search, embedded link, etc.) of a watch of a content item, and so on. The behavior logs may provide data for a predetermined time period, such as for the past one month or the past six months, for example.

In one implementation, the related content item graph is constructed so that for any pair of content items in the content data 231, (Vi, Vj), if the content items have an incidence of co-occurrence (e.g., are watched by the same user in a short time window or are included in the results of the same search query and are also selected from the results of that same search query), a weight Wij (e.g., between the two content items in the related content item graph) is increased by a certain amount. This increase amount may be configured by an administrator of the content sharing platform. If the final weight Wij reaches a threshold (e.g., after assessment of all user behavior logs), an edge Eij may be added between the two content items in the related content item graph; otherwise (e.g., if the weight between the two content items does not exceed the threshold), the two content items are not connected and the weight Wij is set to zero.

Based on the related content item graph constructed by the related content item graph module 205, the cluster graph and transition module 210 clusters (e.g., organizes into groups) the content items 231 of the content sharing platform into a plurality of clusters. The clustering may be organized so that content items in the same cluster are connected to each other as much as possible (e.g., the weights between content items reflected in the related content item graph are maximized) and so that the number of clusters is minimized. In some implementations, graph clustering algorithms, such as normalized cut, for example, may be utilized to perform the clustering.

When the clusters are determined, the cluster graph and transition module 210 then builds a cluster graph. In one implementation, the cluster graph is a directed graph among the identified clusters. Similar to the identification of clusters, the cluster graph is also built based on the content item relatedness, as evidenced in the behavior logs of the users of the content sharing platform. For example, assume that a pair of content items (Vi, Vj) are watched successively by the same user (i.e., the user watched Vi and then immediately watched Vj) or were included in the results of the same search query and are also selected from the results of that same search query (may be selected by different users). When this occurs, if Vi belongs to cluster Ck and Vj belongs to Cl, then a weight Wkl between clusters Ck and Cl may be increased by a predetermined amount. If the final weight Wkl reaches a threshold, an edge Ekl may be added between (Ck, Cl) to the cluster graph. Otherwise, the pair (Ck, Cl) is not connected and the weight Wkl is set to zero.

The cluster graph and transition module 210 may then utilize the cluster graph to generate a cluster transition matrix. Although the present description describes the use of a matrix, implementations are not limited to this type of data structure and other types of data storage elements may be utilized in place of the matrix, such as an array or any other arrangement of objects. Every element in the cluster transition matrix represents a probability that users watching a content item in one cluster transition to watching a content item in another cluster (or within the same cluster).

In one implementation, the cluster transition matrix, P, may be an n×n matrix, where n is the number of content item clusters. Pij may represent the probability that the users of the content sharing platform, after watching a content item in cluster Ci, choose the next content item from cluster Cj to watch. Pij may be a function of the weight, Wij, associated with the edge from Ci to Cj. As such, Wij and Pij are proportionally related, so that when Wij increases, so does Pij. One representation of Pij may be Pij=exp (Wij/σ)/Z, where Z is a normalizer to make $\Sigma_j$ Pij=1. In one implementation, σ may represent a pre-defined parameter that controls how much deference is given to the weight, Wij. For example, if there is uncertainty associated with the weight Wij, then σ is defined as a large value, and vice versa. As discussed above, the cluster transition matrix illustrates probabilities of transitions between clusters for all users of the content sharing platform (not just an individual user). Once the cluster transition matrix is generated, it may be stored in data store 106 as transition data 233.

Concurrently with, or separate from, generation of the cluster transition matrix, user modeling module 215 may model preferences of each user of the content sharing platform in relation to the identified clusters. In one implementation, a user of the content sharing platform may be modeled by M, where M={(ci, si)|i=1, ..., m}, and where the set of clusters C={c1, ..., cm} represents the user's interest (e.g., the preferred content item clusters of the user). C may be chosen by first selecting a subset of the clusters, where each cluster in the subset contains at least N (N>0) content items watched by the user, resulting in an initial set C0. If C0 is too small, C0 may be expanded by including the clusters that can be transitioned from C0 in the transition matrix. In some implementations, the number of clusters, m, in the set of clusters, C, may vary between individual users of the content sharing platform.

The user modeling module 215 may then assign a user preference score, s, to each cluster, c, in C. The user preference score indicates a level of user interest with respect to the corresponding cluster. In one implementation, the score is a function of the number of content items in the cluster watched by the user and/or the frequency of viewing by the user of the content items in the cluster. In some implementations, the user preference scores are normalized so that their sum is 1. Completed user models may be stored in data store 106 as user model data 234. In one implementation, the user modeling component 140 may process content items of the content sharing platform, and model user preferences on a periodic basis, such as on a daily basis.

When the transition matrix 233 and user model 234 have been generated by user modeling component 140, playlist generation component 150 may utilize this data to generate a personalized and continuous playlist for each user of the content sharing platform. Playlist generation component 150 automatically selects content items to populate a playlist that may be provided in a graphical user interface (GUI) of the content sharing platform. For example, the playlist may be provided on a homepage GUI of the user on the content sharing platform. In another example, the playlist may be provided on a dedicated playlist GUI of the content sharing platform.

When the playlist generation component 150 receives a signal or other indication that a user playlist is transitioning to a new song (e.g., at the beginning of the playlist or during playback of the playlist), the playlist generation component 150 utilizes the transition matrix 233 and user model 234 to automatically select for the user a next content item that caters to the user's current preference, in order to populate the user playlist.

The automatic selection process begins with the cluster selection module 220 selecting a preferred cluster of the clusters from which to select a content item for the user. There are two scenarios that the cluster selection module 220 addresses. The first scenario is at the beginning or start of the user playlist. At this time, the playlist generation component 150 is selecting a first content item for the user. The cluster selection module 220 selects the first content item cluster based on current preferences of the user as determined from the user model 234 generated by the user modeling component 140. In one implementation, the cluster with the highest user preference score is selected. In another implementation, the cluster can be selected by weighted sampling based on the preference scores.

The second scenario occurs during the middle of the playback of the playlist (e.g., subsequent to a first content item being played in the user playlist). In this case, the cluster selection module 220 transitions from one cluster to another cluster (or possibly transitions within the same cluster). The cluster selection module 220 may select a next cluster based on both of (1) a transition probability between the current cluster and the selected next cluster and (2) a preference score of the user for the selected next cluster.

For example, suppose the current state of the user model is M={(ci, si)|i=1, ..., m} and the last cluster chosen by the user is Cl. The next chosen cluster Ck is expected to (1) smoothly transit from the last cluster Cl and (2) satisfy the user preference as much as possible (i.e., its preference score s is large). As such, the next cluster Ck is selected to maximize H(Plk, Sk), where Plk is the transition probability from Cl to Ck (the transition, P, is learned above) and H trades off between the transition probability Plk and the preference score Sk. In one implementation, H may be determined as follows: $H(Plk, Sk)=Sk*Plk^{\alpha}$. The symbol a may be a predefined parameter that controls how much deference is given to the inputs Sk and Plk. If there is more certainty associated with Sk than Plk, then a larger a may be chosen (e.g., at least greater than 1), otherwise, a smaller a may be chosen (e.g., at least less than 1).

Once a cluster is selected by cluster selection module 220, the content item selection module 225 selects a content item from the chosen cluster. This selected content item is populated in the user playlist as the next content item to be played. In one implementation, a probability of selection is applied to each content item in the chosen cluster, and this probability is used to select a content item from the cluster. To maximize the user session length and improve user experience, some or all of the following guidelines may be applied by the content item selection module 225 when selecting a content item, v, from cluster, Ck, based on probability of selection.

A first guideline includes: if v appeared in the user playlist previously, the probability of selecting v should be lowered. A second guideline includes: the higher the quality (in terms of format, shakiness, noise, etc.) of v, the higher the probability of v being selected. A third guideline includes: the more recent v is (e.g., in terms of time since upload to the content sharing platform), the higher probability of v being selected. Once a content item is selected by the content item selection module 225, identification data of the content item (or the content item itself) is passed on to be included in the user playlist.

After the user watches, skips, likes, or dislikes a content item, the playlist generation component 150 automatically selects, for the user, a next content item that caters to the user's current preference. The user model 234 learned offline by the user modeling component 140 captures the user's long-term interests. However, the current interests of the user may slightly deviate from the user's long term interest, and even gradually vary all of the time. As a result, the user model adjustment module 230 may dynamically adapt the user model 234 to capture the user's current interest.

For example, a content item, v, may be selected from cluster Ck and presented to the user as part of the user playlist. Based on the user's behavior and feedback with respect to this selected content item (e.g., watch a major portion of the content item, like content item, dislike content item, add to favorite, skip, etc.), the user model M may be dynamically adjusted to capture the user's current preference. Some or all of the following guidelines may be applied to adjust the user model M:

(1) If the user watched a major portion of the content item, increase the user preference score, Sk, for the cluster of the content item by a predetermined amount (configurable by an administrator of the content sharing platform);
(2) If the user "likes" the content item or adds the content item to a favorite list, increase Sk;
(3) If the user "dislikes" the content item, decrease Sk;
(4) If the user skips the content item, decrease Sk.

The increase/decrease amount of the cluster score, Sk, may be tunable based on configuration settings of the content sharing platform. After adjusting the user preference score, Sk, the user model adjustment module 230 may normalize the preference scores of the user so that their sum is one. In implementations of the disclosure, the playlist generation module 150 continually performs the cluster and content item selection and user model adjustment to populate a user playlist until an indication that the user has discontinued playback of the playlist is received. As a result, a user playlist that is infinite and based on individual user preferences may be created for a user of the content sharing platform, without receiving input from the user with regard to creating the playlist.

Figure 3:
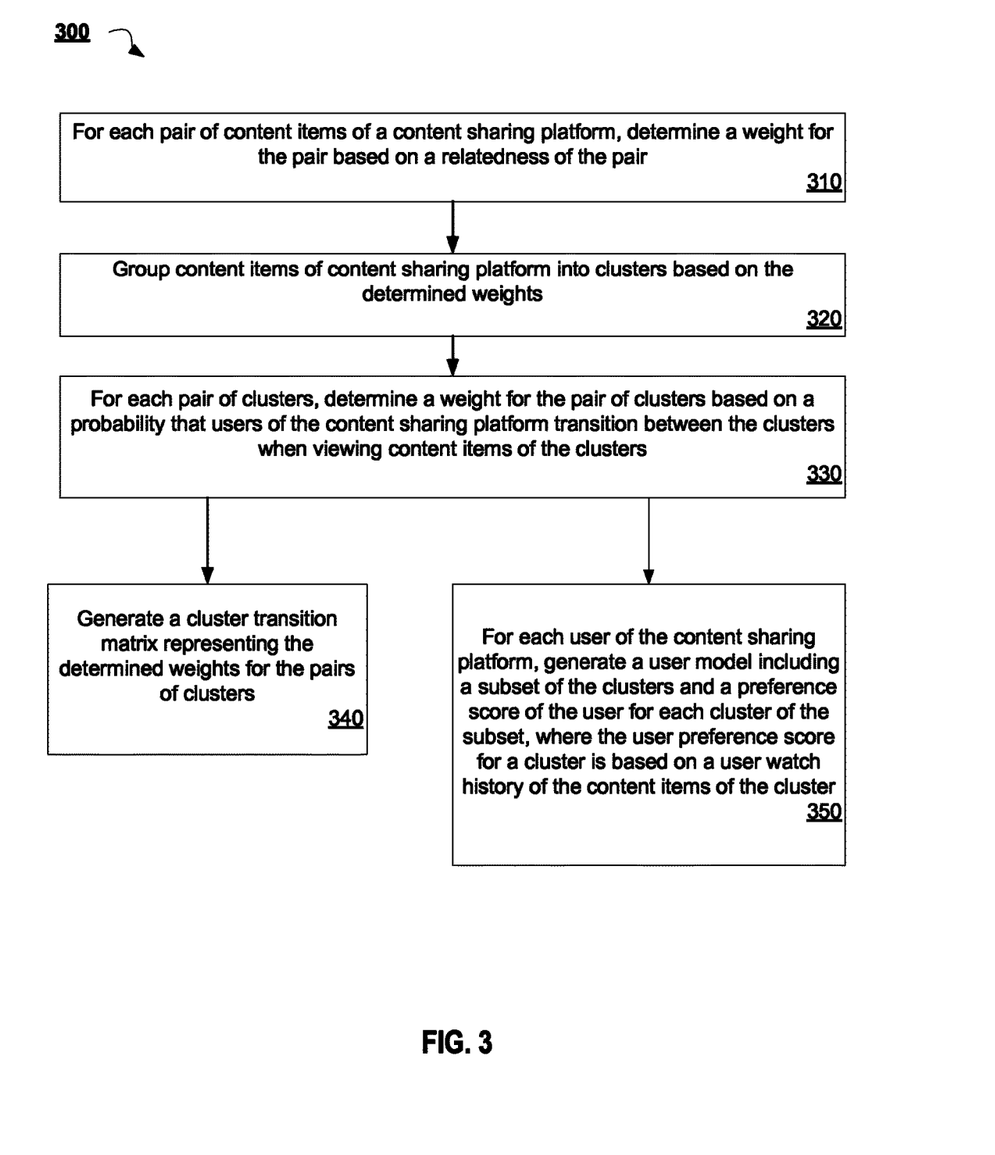
FIG. 3 is a flow diagram illustrating a method for user modeling to create personalized and continuous playlists for a content sharing platform based on user history, according to some implementations of the disclosure.

FIG. 3 is a flow diagram illustrating a method 300 for user modeling to create personalized and continuous playlists for a content sharing platform based on user history, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by user modeling component 140, as shown in FIGS. 1 and 2.

Referring to FIG. 3, at block 310, method 300 begins when, for each pair of content items of a content sharing platform, a weight is determined for the pair based on relatedness of the pair. In one implementation, behavior logs of users of the content sharing platform are referenced to determine the relatedness between content item pairs. Relatedness of a content item pair may be computed based, at least in part, on frequency of co-occurrence of the content item pair, among other factors. Then, at block 320, the content items of the content sharing platform are grouped into clusters based on the determined weights from block 310. In some implementation, the number of content items in a cluster varies between clusters.

Subsequently, at block 330, for each pair of the clusters identified in block 320, a weight between the clusters is determined. In one implementation, the weight between cluster pairs is based on a probability that users of the content sharing platform transition between the clusters in the pair when viewing content items of the clusters. The probability of transition between clusters may be based on the behavior logs of the users of the content sharing platform.

At block 340, a cluster transition matrix is generated, which represents the determined weights for the pairs of clusters generated in block 330. In one implementation, the cluster transition matrix is an n×n matrix, where n is the number of clusters generated at block 320. Each element in the n×n matrix represents the determined transition probability between the cluster pair identified by the particular x, y intersection in the matrix where the element is located.

Furthermore, at block 350, a user model for each user of the content sharing platform is generated. In one implementation, the user model includes an identification of a subset of the clusters and a corresponding user preference score for each cluster of the subset. In one implementation, the subset of clusters includes the clusters having more than a predetermined number of content items previously viewed by the user. The user preference score for each cluster of the subset may be based on the user watch history of content items within the cluster.

Figure 4:
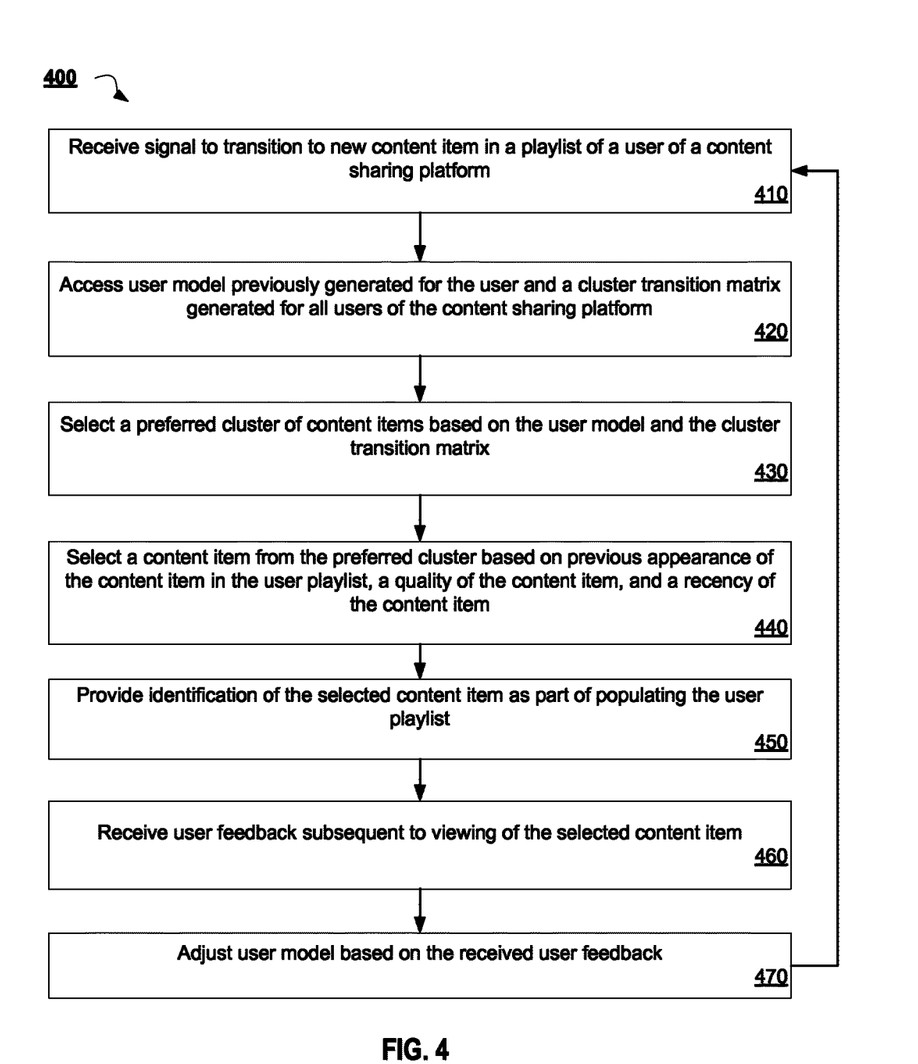
FIG. 4 is a flow diagram illustrating a method for generation of a personalized and continuous playlist for a user of a content sharing platform, according to an implementation of the disclosure.

FIG. 4 is a flow diagram illustrating a method 400 for generation of a personalized and continuous playlist for a user of a content sharing platform, according to an implementation of the disclosure. The method 400 may be performed by processing logic that comprises hardware (e.g., circuitry, dedicated logic, programmable logic, microcode, etc.), software (e.g., instructions run on a ponent 150 as shown in FIGS. 1 and 2.

Referring to FIG. 4, at block 410, method 400 begins when a signal is received to transition to a new content item in a playlist of a user of a content sharing platform. In one implementation, the signal may be received at initiation of the user playlist or during the middle of (e.g., playback of) the user playlist. Then, at block 420, a user model previously generated for the user and a cluster transition matrix generated for all users of the content sharing platform are accessed. The user model may represent user preference scores of the user for a subset of clusters of content items of the content sharing platform. The user preference scores may be based on a watch history of the user with respect to content items of the subset of clusters.

At block 430, a preferred cluster of a set of clusters of content items of the content sharing platform is selected. The preferred cluster may be selected based on the accessed user model and/or the accessed cluster transition matrix. Subsequently, at block 440, a content item is selected from the preferred cluster. In one implementation, the content item is selected based on a previous appearance of the content item in the user playlist, a quality of the content item, and/or a recency of the content item.

At block 450, identification of the content item is provided for purposes of population of the user playlist. Then, at block 460, user feedback is received subsequent to the viewing of the selected content item in the user playlist. The user feedback may include watching a major portion of the content item, liking content item, disliking content item, adding the content item to favorites, skipping the content item, and so on. Subsequently, at block 470, the user model is adjusted based on the received user feedback. For example, the user preference score for the cluster of the content items may be increased or decreased based on the feedback (e.g., increased if the user watched, liked, or added the content item to favorites and decreased if the user skipped or disliked the content item).

Figure 5:
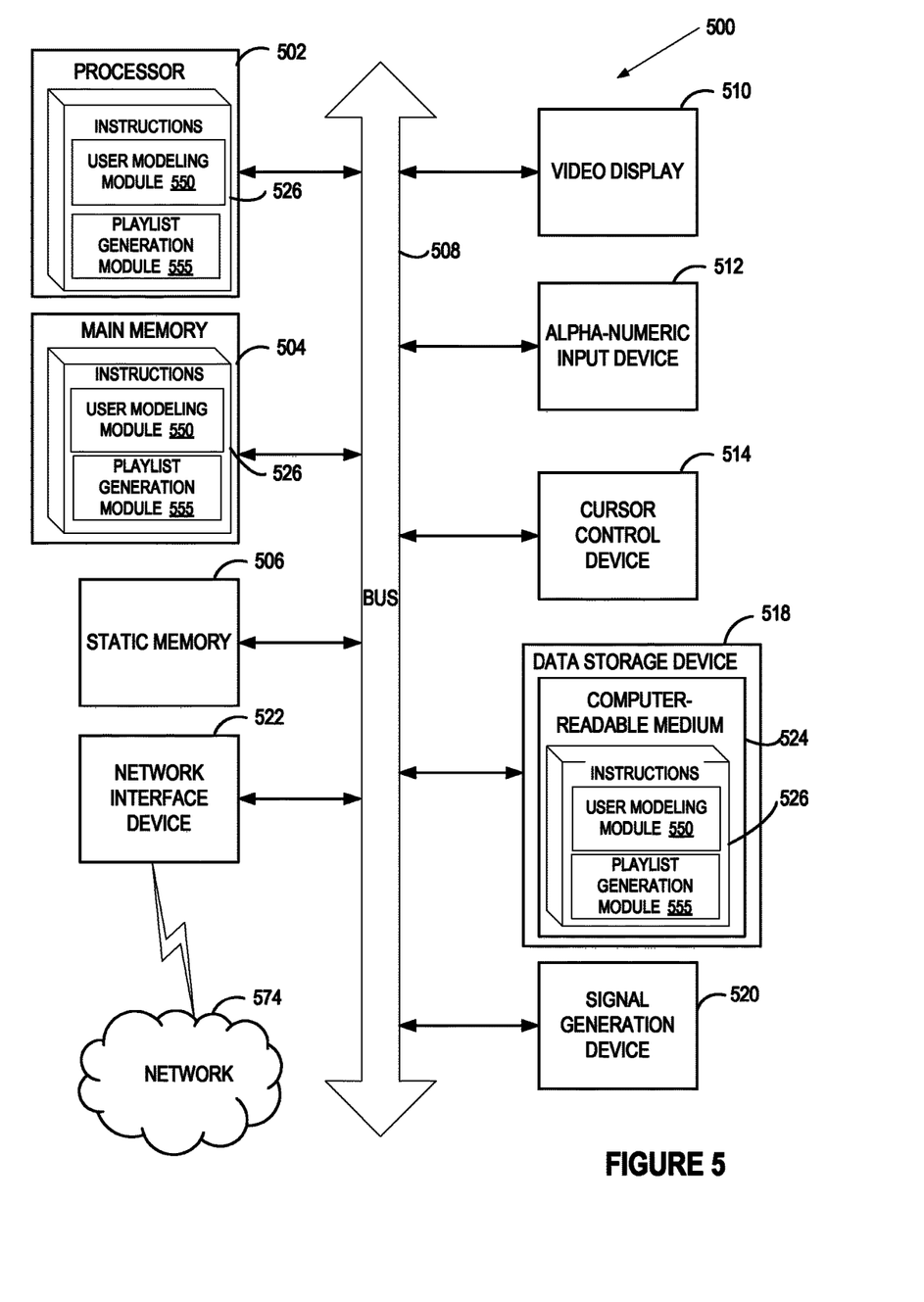
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for a user modeling component 140 and a playlist generation component 150, which may correspond, respectively, to their identically-named counterparts described with respect to FIGS. 1 and 2, and/or a software library containing methods that call a user modeling component and a playlist generation component for creating personalized and continuous playlists for a content sharing platform based on user history. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
grouping, by a processing device, content items of a content sharing platform into groups of content items based on whether users of the content sharing platform access the content items close together in time and based on whether the content items co-occur in search results and are selected from the search results when the content items co-occur;
determining probabilities that the users of the content sharing platform transition between the groups of content items when viewing the content items;
assigning, for a user of the users, corresponding scores to the groups of content items that are part of a subset of the groups, wherein the scores represent preferences of the user for viewing the content items of the subset;
selecting, for the user, one of the groups of content items in the subset based on:
the assigned scores to the groups of content items; and
the probabilities;
providing a content item from the selected group to include in a playlist generated for the user; and
repeating the selecting the group and the providing the content item until an indication is received to stop playback of the playlist for the user.

2. The method of claim 1, wherein relatedness between the content items in the group is in view of at least one of:
the content items being viewed by a same user of the users in a time interval; or
the content items being returned as query items and selected in a same search result by one or more of the users.

3. The method of claim 1, wherein the assigned scores are a function of a number of viewed content items of the group and are normalized with respect to the other assigned scores associated with the user and assigned to the groups of the subset of groups.

4. The method of claim 1, further comprising:
adjusting the scores associated with the user in view of user feedback associated with the playback of the playlist.

5. The method of claim 1, wherein the subset of groups is selected in view of a number of the content items viewed by the user in the groups of the subset.

6. The method of claim 1, wherein the selecting the one of the groups further comprises selecting the one of the groups of the subset that maximizes a function applied to:
one of the determined probabilities of transitioning from a previous selected group of the subset to the selected group; and
the assigned score for the selected group.

7. The method of claim 1, wherein providing the content item is in view of at least one of previous appearance of the content item in the playlist, quality of the content item, or age of the content item in terms of time since upload to the content sharing platform.

8. The method of claim 4, wherein the assigning the corresponding scores is repeated in view of the adjusted scores associated with the user.

9. The method of claim 1, wherein the playlist of the user comprises a plurality of the content items that stream to the user without interruption.

10. A non-transitory machine-readable storage medium storing instructions which, when executed, cause a processing device to perform operations comprising:
grouping, by the processing device, content items of a content sharing platform into groups of content items based on whether users of the content sharing platform access the content items close together in time and based on whether the content items co-occur in search results and are selected from the search results when the content items co-occur;
determining probabilities that the users of the content sharing platform transition between the groups of content items when viewing the content items of the groups;
assigning scores associated with a user of the users, the scores corresponding to the groups of content items that are part of a subset of the groups, wherein the scores represent preferences of the user for viewing the content items of the subset;
selecting, for the user, one of the groups of content items in the subset based on:
the assigned scores to the groups of content items; and
the probabilities;
providing a content item from the selected group to include in a playlist generated for the user;

adjusting the scores associated with the user in view of user feedback associated with playback of the playlist; and repeating the selecting the group, the providing the content item, and the adjusting the scores until an indication is received to stop playback of the playlist for the user.

11. The non-transitory machine-readable storage medium of claim 10, wherein relatedness between the content items in the group is in view of at least one of:

the content items being viewed by a same user of the users in a time interval; or the content items being returned as query items and selected in a same search result by one or more of the users.

12. The non-transitory machine-readable storage medium of claim 10, wherein the score associated with the user is a function of a number of viewed content items of the group and is normalized with respect to the other scores associated with the user and assigned to the groups of the subset of groups.

13. The non-transitory machine-readable storage medium of claim 10, wherein assigning the score associated with the user to the groups is repeated based on new data representing current behavior and feedback of the user received since a previous iteration of the assigning.

14. The non-transitory machine-readable storage medium of claim 10, wherein selecting the one of the groups further comprises selecting the one of the groups of the subset of the groups that maximizes a function applied to both of a probability of the probabilities of transitioning from a previous selected group of the subset of groups to the selected group and the assigned score for the selected group.

15. The non-transitory machine-readable storage medium of claim 10, wherein the providing the content item is in view of at least one of appearance of the content item in the playlist previously, quality of the content item, or age of the content item in terms of upload to the content sharing platform.

16. A system comprising:

a memory to store a plurality of content items; and a processing device communicably coupled to the memory, the processing device to:

group content items of a content sharing platform into groups of content items based on whether users of the content sharing platform access the content items close together in time and based on whether the content items co-occur in search results and are selected from the search results when the content items co-occur;

calculate probabilities that the users of the content sharing platform transition between the groups of content items when viewing the content items of the groups;

generate a user model for a user of the content sharing platform, the user model comprising a plurality of user preference scores corresponding to groups that are part of a subset of the groups, wherein the user preference score for each group of the subset represents preferences of the user for viewing the content items of the group of the subset;

select, for the user, one of the groups of content items in the subset based on:

the assigned scores to the groups of content items; and the probabilities;

provide a content item from the selected group to include in a playlist generated for the user; and repeat the selecting the group and the providing the content item until an indication is received to stop playback of the playlist for the user.

17. The system of claim 16, wherein the score associated with the user is a function of a number of viewed content items of the group and is normalized with respect to the other scores associated with the user and assigned to the groups of the subset of groups.

18. The system of claim 16, wherein the playlist generation component further to:

adjust the user preferences scores in view of user feedback associated with playback of the playlist, wherein the user preference scores are adjusted in view of new data representing current behavior and feedback of the user received since a previous iteration of the assigning.

19. The system of claim 16, wherein the playlist generation component to select the one of the groups further comprises the playlist generation component to select the one of the groups of the subset of the groups that maximizes a function applied to both of a probability of the probabilities of transitioning from a previous selected group of the subset of groups to the selected group and the user preference score for the selected group.

20. The system of claim 16, wherein the playlist generation component provides the content item in view of at least one of appearance of the content item in the playlist previously, quality of the content item, or age of the content item in terms of upload to the content sharing platform.

* * * * *